United States Patent
Yamamoto

(10) Patent No.: US 10,145,685 B2
(45) Date of Patent: Dec. 4, 2018

(54) ANGULAR VELOCITY SENSOR ELEMENT AND ANGULAR VELOCITY SENSOR USING SAME

(71) Applicant: Panasonic Intellectual Property Management Co., Ltd., Osaka (JP)

(72) Inventor: Kensaku Yamamoto, Osaka (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 166 days.

(21) Appl. No.: 15/098,818

(22) Filed: Apr. 14, 2016

(65) Prior Publication Data

US 2016/0231111 A1  Aug. 11, 2016

Related U.S. Application Data

(63) Continuation of application No. PCT/JP2014/005697, filed on Nov. 13, 2014.

(30) Foreign Application Priority Data

Nov. 19, 2013 (JP) ................................. 2013-238469

(51) Int. Cl.
*G01C 19/5663* (2012.01)
*G01C 19/5607* (2012.01)
(Continued)

(52) U.S. Cl.
CPC ..... *G01C 19/5663* (2013.01); *G01C 19/5607* (2013.01); *G01C 19/5628* (2013.01); *G01C 19/5747* (2013.01)

(58) Field of Classification Search
CPC ............ G01C 19/5663; G01C 19/5628; G01C 19/5747; G01C 19/5733; G01C 19/5719;
(Continued)

(56) References Cited

U.S. PATENT DOCUMENTS 5,635,642 A * 6/1997 Nonomura ......... G01C 19/5607
73/504.16
9,164,119 B2 * 10/2015 Yamamoto ......... G01C 19/5733
(Continued)

FOREIGN PATENT DOCUMENTS

JP  2004-317380 A  11/2004
JP  2006-030125 A  2/2006
(Continued)

OTHER PUBLICATIONS

International Search Report dated Dec. 22, 2014, issued in International Application No. PCT/JP2014/005697. (w/ English translation).

*Primary Examiner* — Helen Kwok
(74) *Attorney, Agent, or Firm* — McDermott Will & Emery LLP

(57) ABSTRACT

An angular velocity sensor element includes a fixing part, an extension part, a twisted extension part, a drive vibrator, a detection vibrator, and a counter beam. The extension part has a first end coupled to the fixing part, and a second end. The twisted extension part has a first end coupled to the second end of the extension part, and a second end. The drive vibrator has a first end coupled to the second end of the twisted extension part, and a second end. The drive vibrator is provided with a drive electrode. The detection vibrator is coupled to the second end of the drive vibrator, and is provided with a first detection electrode. The counter beam is coupled to the second end of the twisted extension part, disposed substantially parallel to the drive vibrator, and configured to vibrate in a direction opposite to a vibration direction of the drive vibrator.

7 Claims, 7 Drawing Sheets

(51) Int. Cl.
*G01C 19/56* (2012.01)
*G01C 19/5628* (2012.01)
*G01C 19/5747* (2012.01)

(58) Field of Classification Search
CPC ............ G01C 19/5607; G01C 19/5642; G01C 19/574
See application file for complete search history.

(56) References Cited

U.S. PATENT DOCUMENTS

| | | | | |
|---|---|---|---|---|
| 9,303,993 | B2* | 4/2016 | Fujii | G01C 19/5719 |
| 9,400,180 | B2* | 7/2016 | Yamamoto | H01L 41/0805 |
| 9,632,105 | B2* | 4/2017 | Yoshiuchi | G01C 19/5769 |
| 2005/0284223 | A1* | 12/2005 | Karaki | G01C 19/56 |
| | | | | 73/504.12 |
| 2006/0016261 | A1 | 1/2006 | Tanaka et al. | |
| 2008/0202238 | A1* | 8/2008 | Tanaka | G01C 19/5607 |
| | | | | 73/504.16 |
| 2009/0064783 | A1* | 3/2009 | Ohuchi | G01C 19/5607 |
| | | | | 73/514.15 |
| 2009/0266163 | A1* | 10/2009 | Ohuchi | G01C 19/5719 |
| | | | | 73/504.12 |
| 2010/0071468 | A1* | 3/2010 | Ohuchi | G01C 19/5719 |
| | | | | 73/504.12 |
| 2010/0116051 | A1* | 5/2010 | Uemura | G01C 19/56 |
| | | | | 73/504.12 |
| 2010/0126270 | A1* | 5/2010 | Terada | G01C 19/5719 |
| | | | | 73/504.12 |
| 2011/0203371 | A1* | 8/2011 | Ohuchi | G01C 19/56 |
| | | | | 73/504.12 |
| 2011/0265567 | A1* | 11/2011 | Uemura | G01P 15/09 |
| | | | | 73/504.12 |
| 2012/0137775 | A1* | 6/2012 | Yamada | H03H 9/21 |
| | | | | 73/504.16 |
| 2012/0227489 | A1* | 9/2012 | Imanaka | G01C 19/574 |
| | | | | 73/504.12 |
| 2012/0318059 | A1* | 12/2012 | Otsuki | H01L 23/057 |
| | | | | 73/504.12 |
| 2013/0192367 | A1* | 8/2013 | Osawa | G01P 9/04 |
| | | | | 73/504.12 |
| 2014/0238131 | A1* | 8/2014 | Yoshiuchi | G01C 19/5769 |
| | | | | 73/514.16 |

FOREIGN PATENT DOCUMENTS

| | | |
|---|---|---|
| JP | 2008-209116 A | 9/2008 |
| JP | 2009-063299 A | 3/2009 |
| JP | 2009-229071 A | 10/2009 |
| JP | 2012-257141 A | 12/2012 |
| WO | 2011/093077 A1 | 8/2011 |
| WO | 2013/046705 A1 | 4/2013 |

* cited by examiner

ANGULAR VELOCITY SENSOR ELEMENT AND ANGULAR VELOCITY SENSOR USING SAME

RELATED APPLICATIONS

This application is a continuation application of PCT International Application No. PCT/JP2014/005697 filed on Nov. 13, 2014, which is based on and in turn claims the benefit of priority to Japanese Patent Application No. 2013-238469, filed on Nov. 19, 2013. The entire disclosures of the above-identified applications, including the specifications, drawings and claims are incorporated herein by reference in their entirety.

BACKGROUND

1. Field of the Invention

The present disclosure relates to an angular velocity sensor employed in a range of electronic apparatuses and an angular velocity sensor element used in the angular velocity sensor.

2. Description of the Related Art

A conventional angular velocity sensor element is described below with reference to FIG. 7. FIG. 7 is a side view of the conventional angular velocity sensor element.

The angular velocity sensor element includes two arms 1, a pair of supports 2, a pair of detectors 3, and a pair of support fixing parts 4. Arms 1 are parallel to each other. The pair of supports 2 is provided at both ends of two arms 1, respectively. Detectors 3 are coupled to supports 2, respectively. Support fixing parts 4 are coupled to detectors 3, respectively. Support fixing parts 4 are to be fixed onto a mounting board (not illustrated). (For example, see Unexamined Japanese Patent Publication No. 2004-317380.)

Next is described the operation of the conventional angular velocity sensor element as configured above. When a drive signal is fed to the angular velocity sensor element from a drive circuit (not illustrated), two arms 1 vibrate in opposite directions along the X axis, as shown by the solid arrows, typically by the piezoelectric effect. Here, if an angular velocity is applied around one of the Y axis and the Z axis that are perpendicular to the X axis, the Coriolis force acts in a direction perpendicular to the driving vibration direction in a plane perpendicular to the rotation axis of the applied angular velocity. For example, if the angular velocity is applied around the Z axis, the Coriolis force acts in the Y-axis direction, as shown by the dashed arrows in FIG. 7. As a result, detected vibration corresponding to the direction of the Coriolis force is transmitted to detectors 3, and a piezoelectric film (not illustrated) provided in each of detectors 3 outputs the detected vibration in the form of an electric signal. A detecting circuit (not illustrated) detects an angular velocity signal based on this electric signal.

SUMMARY

The present disclosure offers an angular velocity sensor element that suppresses fluctuation of output signals due to vibration transmitted to a mounting board.

The angular velocity sensor element of the present disclosure includes a fixing part, an extension part, a twisted extension part, a drive vibrator, a detection vibrator, and a counter beam. The extension part has a first end coupled to the fixing part, and a second end. The twisted extension part has a first end coupled to the second end of the extension part, and a second end. The drive vibrator has a first end coupled to the second end of the twisted extension part, and a second end. A drive electrode is provided on the drive vibrator. The detection vibrator is coupled to the second end of the drive vibrator. A first detection electrode is provided on the detection vibrator. The counter beam is coupled to the second end of the twisted extension part, disposed parallel to the drive vibrator, and configured to vibrate in a direction opposite to a vibration direction of the drive vibrator.

In this configuration, vibration that is transmitted from the detection vibrator to the fixing part via the drive vibrator, twisted extension part, and extension part is canceled by vibration of the counter beam in the opposite direction. Consequently, this can prevent resonance of a mounting board on which an angular velocity sensor including the angular velocity sensor element is mounted. Accordingly, an accuracy of output signals from the angular velocity sensor element is improved.

DETAILED DESCRIPTION OF PREFERRED EMBODIMENT

Figure 7:
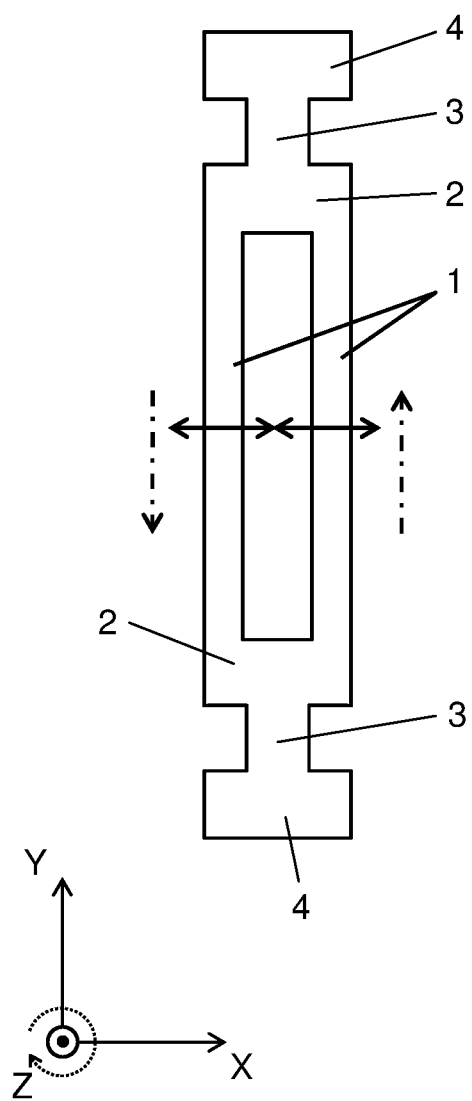
FIG. 7 is a side view of a conventional angular velocity sensor element.

Prior to describing an exemplary embodiment of the present disclosure, a disadvantage of the conventional angular velocity sensor element shown in FIG. 7 is briefly described. Detected vibrations transmitted to detectors 3 are further transmitted to a mounting board (not illustrated), on which an angular velocity sensor including the angular velocity sensor element is mounted, via support fixing part 4. Therefore, the mounting board resonates together. As a result, a resonance frequency of arms 1 at the time of detecting vibration fluctuates, and thus an output signal fluctuates. Accordingly, the output signal becomes unstable.

Figure 1A:
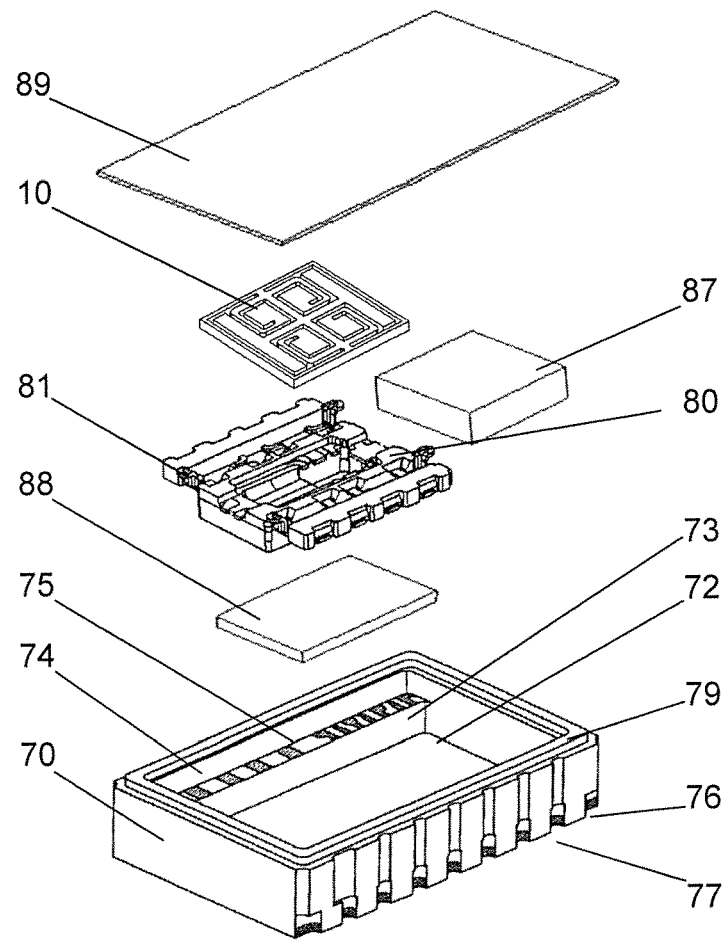
FIG. 1A is an exploded perspective view of an angular velocity sensor in accordance with an exemplary embodiment of the present disclosure.
Figure 1B:
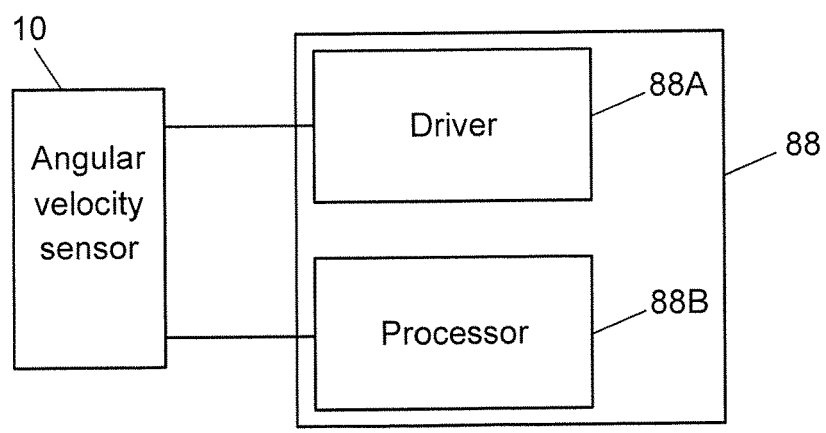
FIG. 1B is a block diagram of the angular velocity sensor shown in FIG. 1A.
Figure 2:
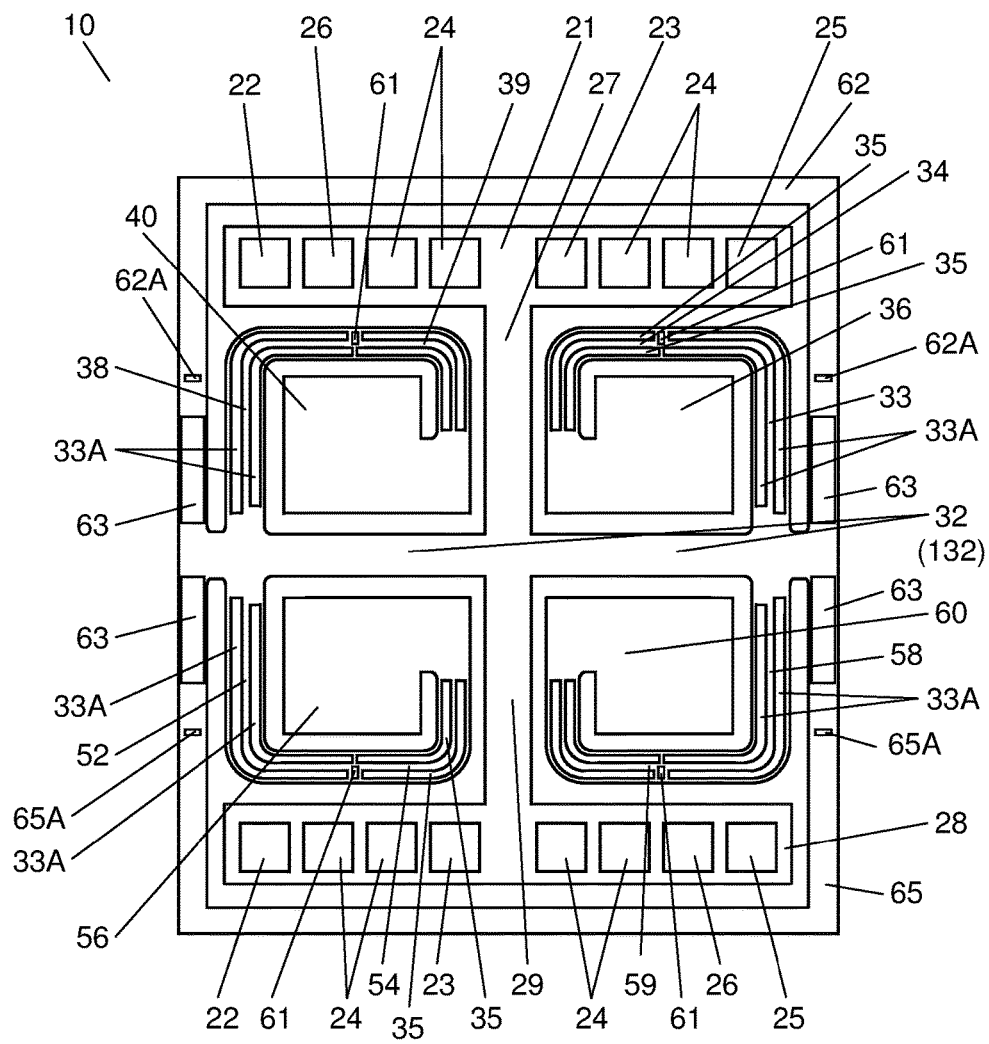
FIG. 2 is a plan view of an angular velocity sensor element in accordance with the exemplary embodiment of the present disclosure.
Figure 3:
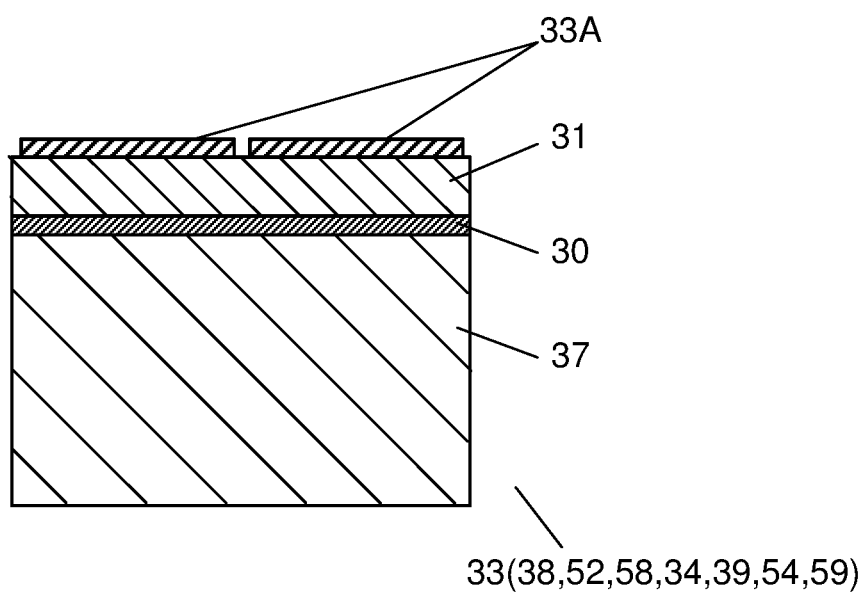
FIG. 3 is a side sectional view of a drive vibrator and a detection vibrator in the angular velocity sensor element shown in FIG. 2.

Hereinafter, angular velocity sensor element 10 in accordance with the exemplary embodiment of the present disclosure and an angular velocity sensor using this element are described with reference to drawings. FIG. 1A is an exploded perspective view of the angular velocity sensor in the exemplary embodiment of the present disclosure. FIG. 1B is a block diagram of the angular velocity sensor shown in FIG. 1A. FIG. 2 is a plan view of angular velocity sensor element 10. FIG. 3 is a side sectional view of a drive vibrator and a detection vibrator in angular velocity sensor element 10.

As shown in FIG. 1A, this angular velocity sensor includes angular velocity sensor element 10, IC 88, and case 70. IC 88 vibrates angular velocity sensor element 10 by applying AC voltage to angular velocity sensor element 10. IC 88 also processes an output signal output from angular velocity sensor element 10. Case 70 houses angular velocity sensor element 10 and IC 88. Case 70 is provided with power electrode 76, GND electrode 77, and an output electrode (not illustrated) that are electrically coupled to IC 88, on an outer bottom face thereof. The output electrode is provided close to the center of the outer bottom face of case 70.

Case 70 has a layered structure of ceramic and wiring conductor from an inner bottom face and an inner side face to the outer bottom face. In particular, the bottom is configured with multilayer circuit board 72 with wiring pattern (not illustrated). The inner side face of side wall 73 of case 70 is provided with step 74, and terminal electrodes 75 are provided on step 74. As described above, power electrode 76, GND electrode 77, and the output electrode (not illustrated) are provided on the outer bottom face of case 70. Terminal electrodes 75 are electrically coupled to power electrode 76, GND electrode 77, and the output electrode, respectively via the wiring patterns of multilayer circuit board 72. Metal frame 79 made of kovar is provided on a top face of side wall 73.

IC 88 is disposed on the inner bottom face of case 70. As shown in FIG. 1B, IC 88 includes driver 88A for supplying drive signals to angular velocity sensor element 10 and processor 88B for calculating angular velocity applied to angular velocity sensor element 10 based on an output signal from angular velocity sensor element 10. More specifically, driver 88A supplies the drive signal to drive electrode land 22 shown in FIG. 3, and processor 88B calculates angular velocity applied to angular velocity sensor element 10 based on the output signal from second detection electrode land 23.

This angular velocity sensor further includes resin placement member 80, acceleration sensor element 87, and lid 89. Placement member 80 supports angular velocity sensor element 10. More specifically, placement member 80 supports first fixing part 21 and second fixing part 28 shown in FIG. 2. Placement member 80 also includes eight terminals 81 electrically coupled to terminal electrodes 75 in case 70, respectively. With this structure, case 70 supports placement member 80 from the periphery thereof via terminals 81. Acceleration sensor element 87 is provided along with IC 88 on the inner bottom face of case 70, and electrically coupled to terminal electrodes 75 by wires (not illustrated). Lid 89 made of kovar covers an opening of case 70.

Next, the structure of angular velocity sensor element 10 is described with reference to FIGS. 2 and 3. Angular velocity sensor element 10 includes first fixing part 21, second fixing part 28, first extension part 27, second extension part 29, a pair of twisted extension parts 32, first drive vibrator 33, second drive vibrator 38, third drive vibrator 52, fourth drive vibrator 58, first detection vibrator 34, second detection vibrator 39, third detection vibrator 54, fourth detection vibrator 59, first counter beam 62, and second counter beam 65.

First extension part 27 has a first end coupled to first fixing part 21, and a second end. Second extension part 29 has a first end coupled to second fixing part 28, and a second end. Twisted extension parts 32 have first ends coupled to the second ends of first extension part 27 and second extension part 29, respectively, and second ends.

Each of first drive vibrator 33, second drive vibrator 38, third drive vibrator 52, and fourth drive vibrator 58 has a first end coupled to the second end of one of twisted extension parts 32, and a second end; and is provided with drive electrodes 33A. First detection vibrator 34, second detection vibrator 39, third detection vibrator 54, and fourth detection vibrator 59 are coupled to the second ends of first drive vibrator 33, second drive vibrator 38, third drive vibrator 52, and fourth drive vibrator 58, respectively, and provided with first detection electrodes 35, respectively.

First counter beam 62 is coupled to the second ends of twisted extension parts 32, and is provided substantially parallel to first drive vibrator 33 and second drive vibrator 38. In addition, first counter beam 62 is configured to vibrate in a direction opposite to the vibration direction of first drive vibrator 33 and second drive vibrator 38. Second counter beam 65 is coupled to the second ends of twisted extension parts 32, and is disposed substantially parallel to third drive vibrator 52 and fourth drive vibrator 58. In addition, second counter beam 65 is configured to vibrate in a direction opposite to the vibration direction of third drive vibrator 52 and fourth drive vibrator 58.

First fixing part 21 is formed of silicon (Si), and is provided with drive electrode land 22, second detection electrode land 23, four first detection electrode lands 24, GND electrode land 25, and monitor electrode land 26, on the top face thereof. Second fixing part 28 is also formed of Si, and is provided with drive electrode land 22, second detection electrode land 23, four first detection electrode lands 24, GND electrode land 25, and monitor electrode land 26, on the top face thereof. First extension part 27 and second extension part 29 are also formed of Si. The first end of first extension part 27 is coupled to fixing part 21, and the first end of second extension part 29 is coupled to second fixing part 28. Drive electrode lands 22, second detection electrode lands 23, first detection electrode lands 24, GND electrode lands 25, and monitor electrode lands 26 are electrically coupled to terminals 81 shown in FIG. 1A, respectively, by wires (not illustrated).

The first ends of twisted extension parts 32 are coupled to the second ends of first extension part 27 and second extension part 29, respectively. Twisted extension parts 32 are also linearly coupled to each other. In other words, rectangular parallelepiped twisted extension part continuous body 132 is sandwiched at substantially the center of side faces thereof by first extension part 27 and second extension part 29, and thus twisted extension part continuous body 132, first extension part 27, and second extension part 29 are coupled at this portion.

First drive vibrator 33 extends in a +Y direction perpendicular to twisted extension part 32, and is provided with a pair of drive electrodes 33A on a top face thereof. As shown in FIG. 3, first drive vibrator 33 includes a pair of drive electrodes 33A, common GND electrode 30, and piezoelectric layer 31. Drive electrodes 33A and common GND electrode 30 are formed of a thin alloy film of Pt and Ti. Piezoelectric layer 31 is formed of a thin PZT film. Piezoelectric layer 31 is provided on the top face of common GND electrode 30. Drive electrodes 33A are provided on the top face of piezoelectric layer 31. Common GND electrode 30 is formed on board 37, typically made of Si.

First detection vibrator 34 extends from the second end of first drive vibrator 33 in a −X direction perpendicular to the extending +Y direction of first drive vibrator 33, and its approximate center is bent to form an L shape. First detection vibrator 34 is provided with first detection electrodes 35 for detecting an angular velocity in the Z-axis direction, on a top face thereof. Same as first drive vibrator 33, first detection vibrator 34 also includes a pair of first detection electrodes 35, common GND electrode 30, and piezoelectric layer 31. First detection electrodes 35 are also formed of a thin alloy film of Pt and Ti. Piezoelectric layer 31 formed of a thin PZT film is provided on the top face of common GND electrode 30, and first detection electrodes 35 are provided on the top face of piezoelectric layer 31. Weight 36 is coupled to the second end of first detection vibrator 34.

Second drive vibrator 38 extends in a +Y direction perpendicular to twisted extension part 32 and parallel to first drive vibrator 33, and is also provided with a pair of drive electrodes 33A on a top face thereof. Second detection vibrator 39 extends from the second end of second drive vibrator 38 in a +X direction perpendicular to the extending +Y direction of second drive vibrator 38 and opposite to first detection vibrator 34. Second detection vibrator 39 is also bent at its approximate center to form an L shape. Weight 40 is coupled to the second end of second detection vibrator 39.

Third drive vibrator 52 extends from twisted extension part 32 in a −Y direction opposite to second drive vibrator 38 and perpendicular to twisted extension part 32, and is also provided with a pair of drive electrodes 33A on a top face thereof. Third detection vibrator 54 extends from the second end of third drive vibrator 52 in a +X direction perpendicular to the extending −Y direction of third drive vibrator 52, and bent at its approximate center to form an L shape. Third detection vibrator 54 is provided with first detection electrodes 35 on a top face thereof. Weight 56 is coupled to the second end of third detection vibrator 54.

Fourth drive vibrator 58 extends in a −Y direction perpendicular to twisted extension part 32 and parallel to third drive vibrator 52, and is provided with a pair of drive electrodes 33A on a top face thereof. Fourth detection vibrator 59 extends from the second end of fourth drive vibrator 58 in a −X direction perpendicular to the extending −Y direction of fourth drive vibrator 58, and opposite to third detection vibrator 54. Fourth detection vibrator 59 is bent at its approximate center to form an L shape. Weight 59 is coupled to the second end of fourth detection vibrator 59.

Monitor electrode 61 is provided between drive electrodes 33A and first detection electrodes 35 in each of first detection vibrator 34, second detection vibrator 39, third detection vibrator 54, and fourth detection vibrator 59.

First counter beam 62 and second counter beam 65 have a squarely C shape. A first end of first counter beam 62 is coupled to the side face of the first end of twisted extended part continuous body 132. A portion around this first end is parallel to first drive vibrator 33. A second end of first counter beam 62 is coupled to the side face of the second end of twisted extension part continuous body 132. A portion around this second end is parallel to second drive vibrator 38. In addition, a portion extending perpendicular to the portions around the first end and the second end and parallel to twisted extension part continuous body 132 is parallel to portions of first drive vibrator 33 and second drive vibrator 38 where the vibrators are bent and further extended. Second detection electrodes 63 for detecting an angular velocity around Y axis are provided on the top face near the first end and second end of first counter beam 62, respectively.

In the same manner, a first end of second counter beam 65 is coupled to the side face of the first end of twisted extension part continuous body 132, which is the side face opposite to the face where first counter beam 62 is coupled. A portion around this first end is parallel to fourth drive vibrator 58. A second end of second counter beam 65 is coupled to the side face of the second end of twisted extension part continuous body 132, which is the side face opposite to the face where first counter beam 62 is coupled. A portion around this second end is parallel to third drive vibrator 52. A portion perpendicular to the portions around the first end and the second end and parallel to twisted extension part continuous body 132 is parallel to portions of third drive vibrator 52 and fourth drive vibrator 58 where the vibrators are bent and further extended. Second detection electrodes 63 are provided on the top face near the first end and second end of second counter beam 65, respectively.

A pair of grooves 62 formed by removing a part of piezoelectric layer 31 is provided on the top face of first counter beam 62. In the same way, a pair of grooves 65A formed by removing a part of piezoelectric layer 31 is provided on the top face of second counter beam 65. In other words, grooves 62A and 65A for adjusting displacement due to vibration of the drive vibrator and counter beam are preferably formed on a part of each of first counter beam 62 and second counter beam 65.

Drive electrode land 22 in first fixing part 21 is electrically coupled to drive electrodes 33A in first drive vibrator 33 and second drive vibrator 38 via wiring patterns (not illustrated). Second detection electrode land 23 is electrically coupled to second detection electrodes 63 in first counter beam 62 and second counter beam 65 via wiring patterns (not illustrated). First detection electrode lands 24 in first fixing part 21 are electrically coupled to first detection electrodes 35 in first detection vibrator 34 and second detection vibrator 39 via wiring patterns (not illustrated), respectively. Monitor electrode land 26 is electrically coupled to monitor electrodes 61 in first drive vibrator 33 and second drive vibrator 38 via wiring patterns (not illustrated).

Next, an assembly method of angular velocity sensor element 10 as configured above and an angular velocity sensor using this element is described with reference to FIGS. 4A to 4E.

Figure 4A:
FIG. 4A is a sectional view of wafer, which is a material of the angular velocity sensor element shown in FIG. 2.

First, as shown in FIG. 4A, wafer 69 is prepared. On the top face of wafer 69, drive electrode lands 22, second detection electrode lands 23, first detection electrode lands 24, monitor electrode lands 26, GND electrode lands 25, common GND electrode 30, piezoelectric layer 31, drive electrodes 33A, first detection electrodes 35, second detection electrodes 63, monitor electrodes 61, and wiring pattern (not illustrated) are formed in advance. Wafer 69 is formed of Si.

Figure 4B:
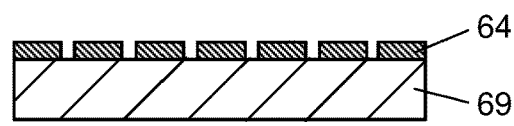
FIG. 4B is a sectional view illustrating an assembly process of the angular velocity sensor element shown in FIG. 2.

Next, resist film 64 such as of aluminum, titanium, silicon oxide, and silicon nitride is formed on the top face of wafer 69 by spin-coating, and then resist film 64 is patterned into a predetermined shape by photolithography, as shown in FIG. 4B.

Figure 4C:
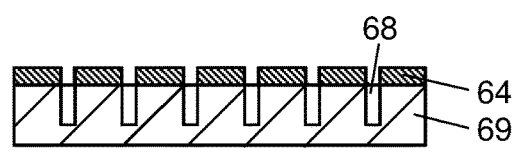
FIG. 4C is a sectional view illustrating the assembly process of the angular velocity sensor element following FIG. 4B.

Then, wafer 69 is placed in a dry-etching device (not illustrated), and fluorine based gas, such as $SF_6$ and $CF_6$, is introduced to etch a portion other than where resist film 64 is provided on wafer 69, so as to form grooves 68, as shown in FIG. 4C.

Figure 4D:
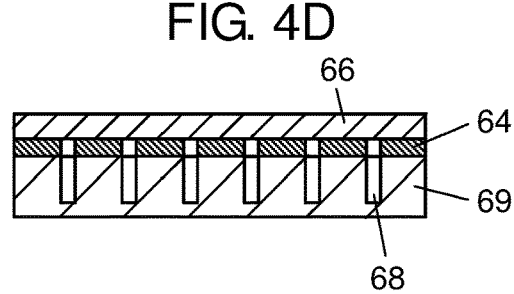
FIG. 4D is a sectional view illustrating the assembly process of the angular velocity sensor element following FIG. 4C.

Next, as shown in FIG. 4D, film 66 is attached to the top face of resist film 64. Film 66 has an adhesive layer (not illustrated). Film 66 protects the top face of wafer 69 on back-grinding of 50 to 200 μm. Then, wafer 69 is turned upside down, and film 66 is fixed onto a chucking table (not illustrated).

Figure 4E:
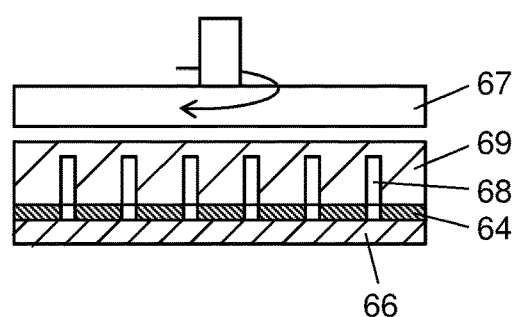
FIG. 4E is a sectional view illustrating the assembly process of the angular velocity sensor element following FIG. 4D.

Then, as shown in FIG. 4E, the rear face of wafer 69 is ground by rotating back-grinding wheel 67.

Next, film 66 is peeled off from resist film 64 by applying UV rays to reduce adhesivity of film 66. Then, resist film 64 is removed and wafer 69 is cut (divided) into pieces to obtain angular velocity sensor element precursors.

At last, laser is applied to form grooves 62A in first counter beam 62 and grooves 65A in second counter beam 65.

On the other hand, ceramic side wall 73 and step 74 are formed over the periphery of the top face of multilayer circuit board 72 configured with a ceramic insulation body (not illustrated) and wiring conductors (not illustrated). Then, terminal electrode 75 is formed with Au on the top face of step 74, and metal frame 79 made of kovar is bonded on the top face of side wall 73.

Next, power electrode 76, GND electrode 77, and the output electrode (not illustrated) are formed on the bottom face of multilayer circuit board 72, using Ag. After mounting IC 88 on the top face of multilayer circuit board 72 in case 70, IC 88 and multilayer circuit board 72 are electrically coupled.

Next, acceleration sensor element 87 is mounted next to IC 88 on the top face of multilayer circuit board 72 in case 70. After that, acceleration sensor element 87 and terminal electrodes 75 in case 70 are electrically coupled by wire-bonding via aluminum wires (not illustrated).

Next, the bottom faces of first fixing part 21 and second fixing part 28 in angular velocity sensor element 10 are bonded onto placement member 80 in which eight terminals 81 are insert-molded in advance. Then, drive electrode lands 22, first detection electrodes lands 24, second detection electrode lands 23, GND electrode lands 25, and monitor electrode lands 26 in first fixing part 21 and second fixing part 28 are electrically coupled to terminals 81 by wire-bonding via aluminum wires (not illustrated).

After soldering eight terminals 81 to terminal electrodes 75 in case 70, terminals 81 are embedded in case 70. At last, lid 89 is bonded onto the opening of case 70 by seam-welding in nitrogen atmosphere.

Next is described the operation of angular velocity sensor element 10 assembled as above and the angular velocity sensor using this element.

When IC 88 applies AC voltage to drive electrode lands 22 in first fixing part 21 and second fixing part 28, this AC voltage is applied to drive electrodes 33A in first drive vibrator 33, second drive vibrator 38, third drive vibrator 52, and fourth drive vibrator 58 via the wiring patterns (not illustrated). In a case where the phase of the AC voltage is in a direction same as a direction of polarization of drive electrodes 33A, a tensile stress is generated in drive electrodes 33A. On the other hand, in a case where the phase of the AC voltage is in an opposite direction, a compression stress is generated in drive electrodes 33A. Accordingly, first drive vibrator 33, second drive vibrator 38, third drive vibrator 52, and fourth drive vibrator 58 are driven to vibrate at velocity V in the X-axis direction in response to the phase of the AC voltage. This drive vibration is transmitted to weights 36, 40, 56, and 60 via first detection vibrator 34, second detection vibrator 39, third detection vibrator 54, and fourth detection vibrator 59, respectively. Weights 36, 40, 56, and 60 are thus driven to vibrate at velocity V in the X-axis direction.

First is described the case when angular velocity around the Z axis is applied to angular velocity sensor element 10. In this case, weights 36, 40, 56, and 60 vibrate in the Y-axis direction by the Coriolis force. Then, portions in first detection vibrator 34, second detection vibrator 39, third detection vibrator 54, and fourth detection vibrator 59 that extend perpendicular to the extending directions of first drive vibrator 33, second drive vibrator 38, third drive vibrator 52, and fourth drive vibrator 58, respectively, vibrate in the Y-axis direction. These portions are parallel to twisted extension parts 32 in a still state. Then, an electric charge corresponding to the angular velocity is generated between first detection electrodes 35. In addition, portions of first detection vibrator 34, second detection vibrator 39, third detection vibrator 54, and fourth detection vibrator 59 which are nearer to the tips than portions bent in the L shape flexurally vibrate in the X-axis direction in line with afore-mentioned driving in the Y-axis direction. Output signals produced by electric charges generated in second detection electrode lands 23 and first detection electrode lands 24 are input to IC 88 via wires (not illustrated) and terminals 81. IC 88 processes these output signals, and externally outputs an output signal for angular velocity from the output electrode in case 70 via one of terminal electrodes 75. In this way, the angular velocity around the Z-axis can be detected.

Figure 5:
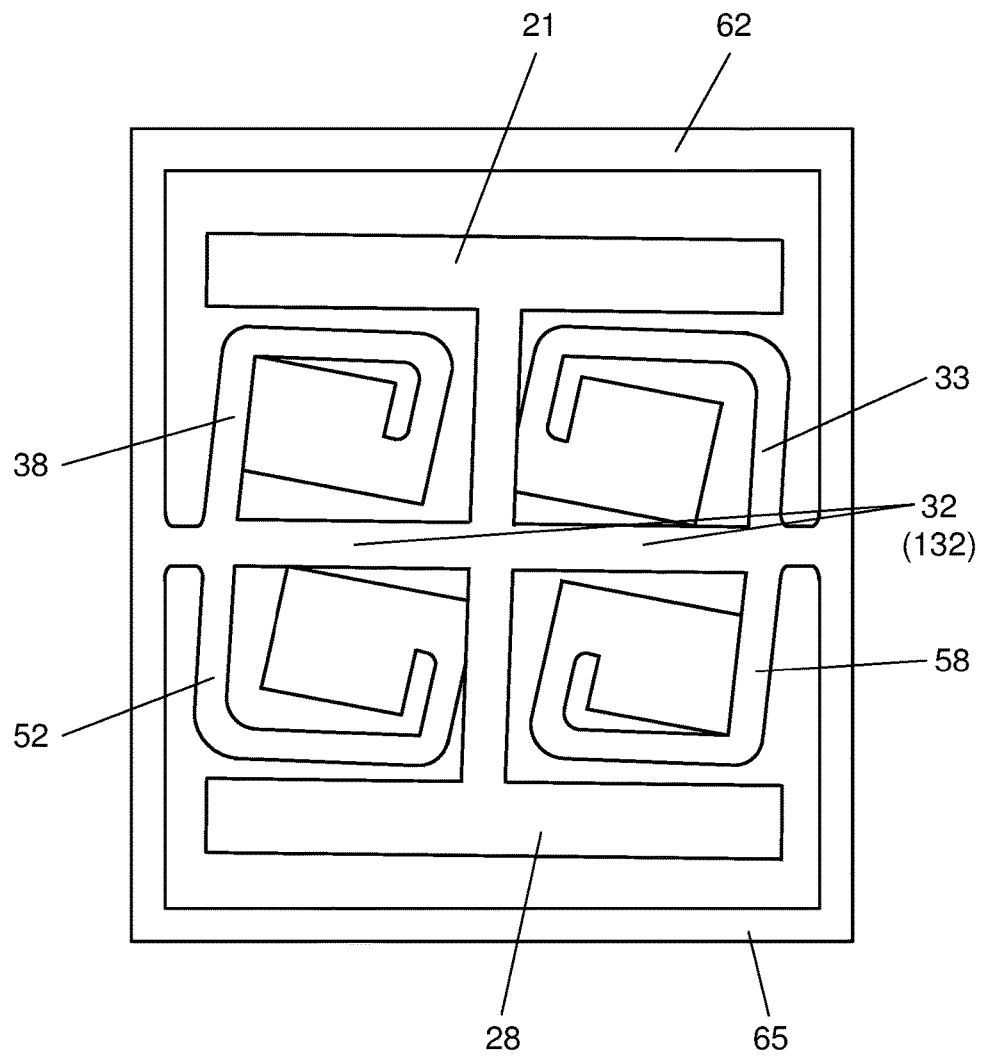
FIG. 5 is a plan view illustrating an operation state of the angular velocity sensor element shown in FIG. 2.
Figure 5:
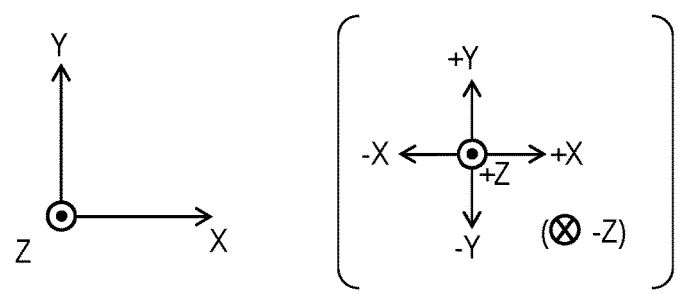

As shown in FIG. 5, when angular velocity around the Z-axis is applied, weights 36, 40, 56, and 60 twist leftward. Whether or not vibration by this twist is transmitted to a board (not illustrated) on which the angular velocity sensor is mounted is studied below.

In angular velocity sensor element 10, first counter beam 62 and second counter beam 65 are coupled to twisted extension part continuous body 132. First counter beam 62 has a portion substantially parallel to first drive vibrator 33 and second drive vibrator 38. A portion near the first end of first counter beam 62 is configured to move in a direction opposite to the movement direction of the gravity center of the total body of first drive vibrator 33, first detection vibrator 34, and weight 36. In the same way, a portion near the second end of first counter beam 62 is configured to move in a direction opposite to the movement direction of the gravity center of the total body of second drive vibrator 38, second detection vibrator 39, and weight 40.

In the same way, second counter beam 65 has a portion substantially parallel to third drive vibrator 52 and fourth drive vibrator 58. A portion near the second end of second counter beam 65 is configured to move in a direction opposite to the movement direction of the gravity center of the total body of third drive vibrator 52, third detection vibrator 54, and weight 56. In the same way, a portion near the first end of second counter beam 65 is configured to move in a direction opposite to the movement direction of the gravity center of the total body of fourth drive vibrator 58, fourth detection vibrator 59, and weight 60.

With this configuration, first counter beam 62 and second counter beam 65 vibrate in the direction opposite to the vibration direction of first drive vibrator 33, second drive vibrator 38, third drive vibrator 52, and fourth drive vibrator 58. Accordingly, vibration transmitted from weights 36, 40, 56, and 60 to the board on which the angular velocity sensor is mounted can be canceled by vibrations of first counter beam 62 and second counter beam 65 in the opposite direction. As a result, resonance of this board is preventable to improve accuracy of output signals.

Next is described the case when angular velocity around the Y-axis is applied to angular velocity sensor element 10. In this case, weights 36, 40, 56, and 60 vibrate in the X-axis direction by the Coriolis force. Then, a twisting force is applied to twisted extension parts 32 via first detection vibrator 34, second detection vibrator 39, third detection vibrator 54, fourth detection vibrator 59, first drive vibrator 33, second drive vibrator 38, third drive vibrator 52, and fourth drive vibrator 58. First counter beam 62 and second counter beam 65 then vibrate in the Z-axis direction. Thus, electric charges are generated in second detection electrodes 63 provided in first counter beam 62 and second counter beam 65. Angular velocity around the Y axis can thus be detected based on output signals generated by these electric charges.

Accordingly, angular velocity around an axis different from that around an axis detected by first detection electrodes 35 is detectable by providing second detection electrodes 63 on first counter beam 62 and second counter beam 65.

Figure 6:
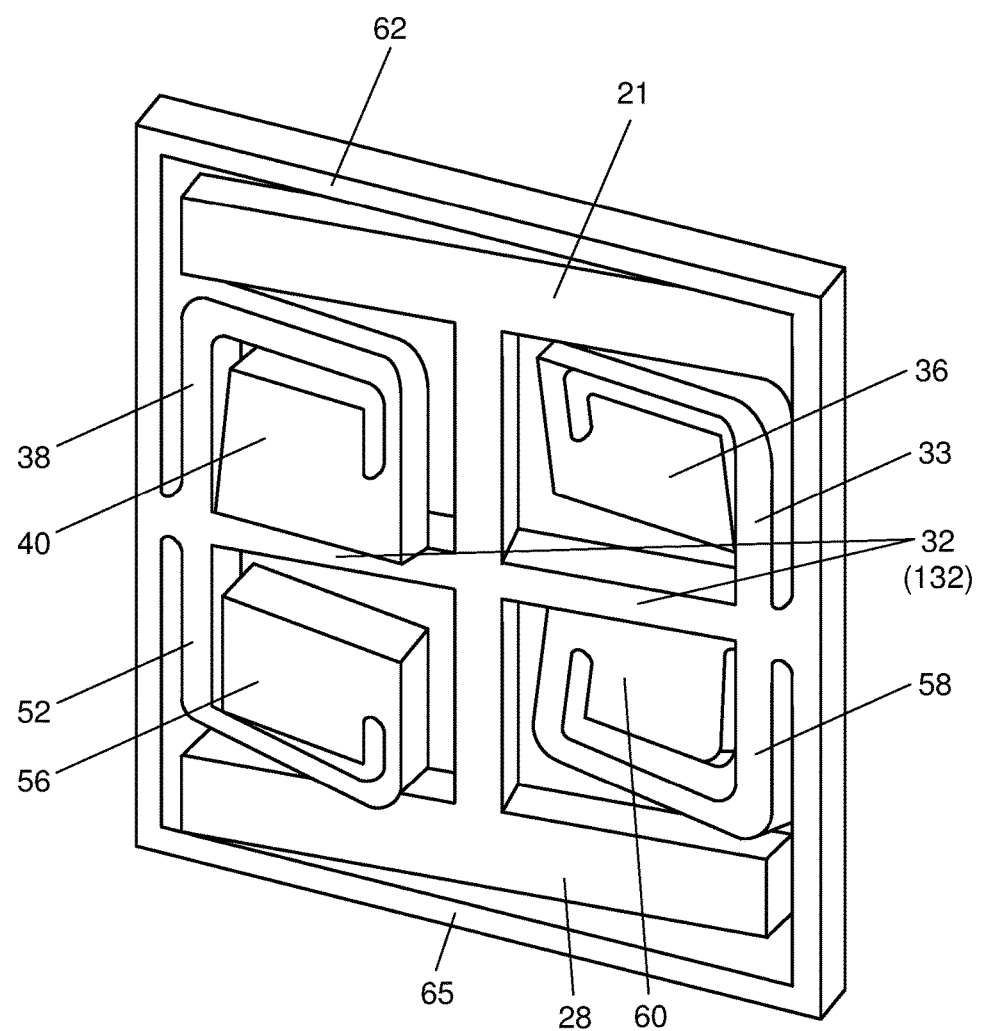
FIG. 6 is a perspective view illustrating an operation state of the angular velocity sensor element shown in FIG. 2.

As shown in FIG. 6, weights 40 and 56 displace to the positive side of the Z axis and weights 36 and 60 displace to the negative side of the Z axis by applying angular velocity around the Y-axis. Whether or not this vibration is transmitted to the board on which the angular velocity sensor is mounted via twisted extension part 32, first extension part 27, second extension part 29, first fixing part 21, and second fixing part 28 is studied below.

In angular velocity sensor element 10, first counter beam 62 and second counter beam 65 are coupled to twisted extension part continuous body 132. First counter beam 62 has the portion substantially parallel to first drive vibrator 33 and second drive vibrator 38. Second counter beam 65 has the portion substantially parallel to third drive vibrator 52 and fourth drive vibrator 58. First counter beam 62 and second counter beam 65 are configured to vibrate in a direction opposite to the vibration direction of first drive vibrator 33, second drive vibrator 38, third drive vibrator 52, and fourth drive vibrator 58. Accordingly, as shown in FIG. 6, when weights 40 and 56 displace to the positive side of the Z axis and weights 36 and 60 displace to the negative side of the Z axis, first counter beam 62 and second counter beam 65 vibrate as follows. A portion of first counter beam 62 close to first drive vibrator 33 vibrates to displace to the positive side of the Z axis. A portion of first counter beam 62 close to second drive vibrator 38 vibrates to displace to the negative sides of the Z-axis. On the other hand, a portion of second counter beam 65 close to third drive vibrator 52 vibrates to displace to the negative side of the Z axis. A portion of second counter beam 65 close to fourth drive vibrator 58 vibrates to displace to the positive side of the Z-axis.

Accordingly, vibration transmitted from weights 36, 40, 56, and 60 to the board on which the angular velocity sensor is mounted can be cancelled. As a result, resonance of this board can be prevented to improve accuracy of output signals.

As described above, it is preferable to form grooves 62A and 65A in parts of first counter beam 62 and second counter beam 65 so as to adjust displacement due to vibration of first detection vibrator 34, second detection vibrator 39, third detection vibrator 54, and fourth detection vibrator 59, and first counter beam and second counter beam 65. This configuration enables to accurately cancel vibration transmitted from the detection vibrators to the fixing parts via the drive vibrators, twisted extension parts, and extension parts.

In angular velocity sensor element 10, grooves 62A and 65A are formed by partially removing piezoelectric layer 31. However, grooves 62A and 65A may be formed by further removing common GND electrode 30 and Si material partially.

Still more, in angular velocity sensor element 10, grooves 62A and 65A are created in first counter beam 62 and second counter beam 65. However, the same effect is achievable by creating grooves in weights 36, 40, 56, and 60.

In the above description, the drive vibrators are operated by the piezoelectric effect, and the detection vibrators use the piezoelectric effect to detect vibration. However, electrostatic effect, for example, may also be employed instead of the piezoelectric effect.

Angular velocity sensor element 10 in FIG. 2 includes two fixing parts, two extension parts, two twisted extension parts, four drive vibrators each provided with two drive electrodes, four detection vibrators each coupled to one of drive vibrators, and two counter beams. However, the effect of the present disclosure is also achievable with an angular velocity sensor element including a fixing part, an extension part, a twisted extension part, a drive electrode, a drive vibrator, a detection vibrator, and a counter beam.

As described above, the angular velocity sensor element of the present disclosure suppresses transmission of vibration to the board on which the angular velocity sensor is mounted. Output signals thus do not fluctuate. Accordingly, it is particularly effective as an angular velocity sensor element employed in an angular velocity sensor for a range of electronic apparatuses.

What is claimed is:

1. An angular velocity sensor comprising:
 a substrate;
 two base parts fixed to the substrate;
 a first extension part extending along a first axis and connecting the two base parts;
 a second extension part extending in a first direction along a second axis crossing the first axis, and having a first end coupled to the first extension part and second end;
 a third extension part extending in a second direction along the second axis that is opposite to the first direction, and having a first end coupled to the first extension part and second end;
 a first arm part coupled to the second extension part, and having a first drive part extending from the second extension part in a third direction along the first axis, a first detection part coupled to the first drive part and a first weight coupled to the first detection part;
 a second arm part coupled to the second extension part, and having a second drive part extending from the second extension part in a fourth direction along the first axis that is opposite to the third direction, a second detection part coupled to the second drive part and a second weight coupled to the second detection part;
 a third arm part coupled to the third extension part and having a third drive part extending from the third extension part in the third direction along the first axis, a third detection part coupled to the third drive part and a third weight coupled to the third detection part;
 a fourth arm part coupled to the third extension part, and having a fourth drive part extending from the third extension part in the fourth direction along the first axis, a fourth detection part coupled to the fourth drive part and a fourth weight coupled to the fourth detection part;
 a first beam coupled to the second end of the second extension part, and being disposed parallel to the first drive part extending in the third direction;

a second beam coupled to the second end of the second extension part, and being disposed parallel to the second drive part extending in the fourth direction;

a third beam coupled to the second end of the third extension part, and being disposed parallel to the third drive part extending in the third direction; and a fourth beam coupled to the second end of the third extension part, and being disposed parallel to the fourth drive part extending in the fourth direction.

2. The angular velocity sensor according to claim 1, further comprising:

a first electrode provided on the first beam;

a second electrode provided on the second beam;

a third electrode provided on the third beam; and a fourth electrode provided on the fourth beam.

3. The angular velocity sensor according to claim 1, further comprising:

a first groove formed in a part of the first beam;

a second groove formed in a part of the second beam;

a third groove formed in a part of the third beam; and a fourth groove formed in a part of the fourth beam.

4. The angular velocity sensor according to claim 1, wherein:

when the first drive part moves in a fifth direction along a third axis perpendicular to the first and second axes, the first beam moves in a sixth direction opposite to the fifth direction, when the second drive part moves in the fifth direction, the second beam moves in the sixth direction, when the third drive part moves in the fifth direction, the third beam moves in the sixth direction, and when the fourth drive part moves in the fifth direction, the fourth beam moves in the sixth direction.

5. The angular velocity sensor according to claim 1, wherein:

the first, second, third and fourth beams respectively include a bent portion such that the first beam is coupled to the third beam, and the second beam is coupled to the fourth beam.

6. The angular velocity sensor according to claim 1, wherein:

the two base parts, the first extension part, the second extension part, the third extension part, the first arm part, the second arm part, the third arm part, the fourth arm part, the first beam, the second beam, the third beam and the fourth beam are formed by silicon.

7. An angular velocity sensor element comprising:

a base part;

an extension part having a first end coupled to the base part, and a second end;

a twisted extension part having a first end coupled to the second end of the extension part, and a second end;

a drive vibrator provided with a drive electrode and having a first end coupled to the second end of the twisted extension part, and a second end;

a vibration detector coupled to the second end of the drive vibrator, and provided with a first detection electrode; and a counter beam coupled to the second end of the twisted extension part, disposed parallel to the drive vibrator, and configured to vibrate in a direction opposite to a vibration direction of the drive vibrator.

* * * * *